S. R. BERGMAN.
ALTERNATING CURRENT MOTOR.
APPLICATION FILED JUNE 3, 1915.

1,240,018.

Patented Sept. 11, 1917.

Spot Welded

Inventor:
Sven R. Bergman,
by
His Attorney.

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

ALTERNATING-CURRENT MOTOR.

1,240,018.  Specification of Letters Patent.  Patented Sept. 11, 1917.

Application filed June 3, 1915. Serial No. 31,835.

*To all whom it may concern:*

Be it known that I, SVEN R. BERGMAN, a subject of the King of Sweden, residing at Nahant, county of Essex, State of Massachusetts, have invented certain new and useful Improvements in Alternating-Current Motors, of which the following is a specification.

My invention relates to alternating current induction motors, and particularly to the secondary winding of such motors. The object of my invention is to improve the construction of induction motors, and particularly to provide a novel and improved construction of secondary winding for such motors. More particularly my invention aims to provide a novel and improved secondary winding construction for securing relatively high impedance at or near standstill and relatively low impedance at running speeds of the motor.

Figure 1:
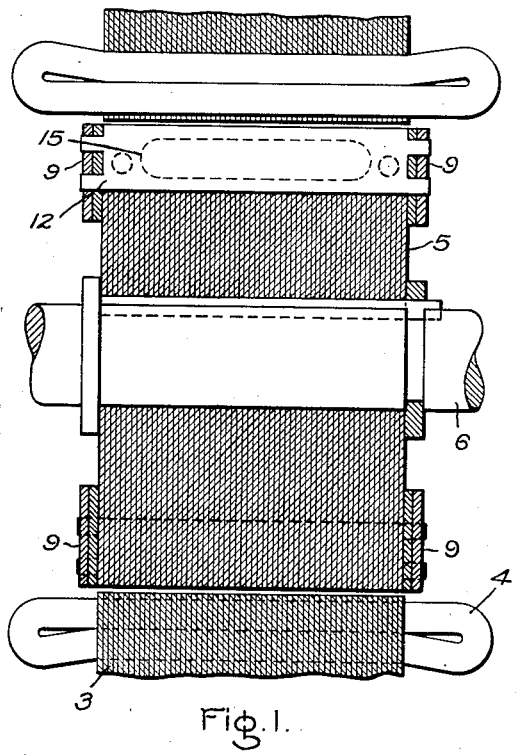
Figure 2:
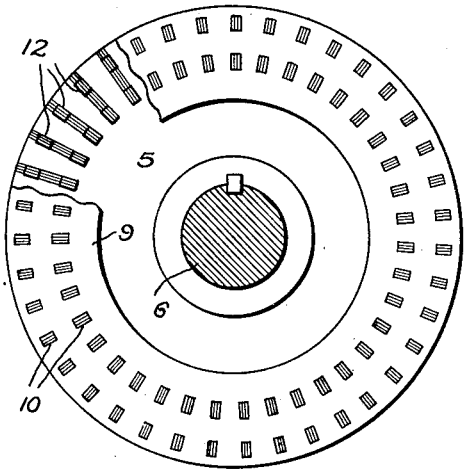
Figure 3:
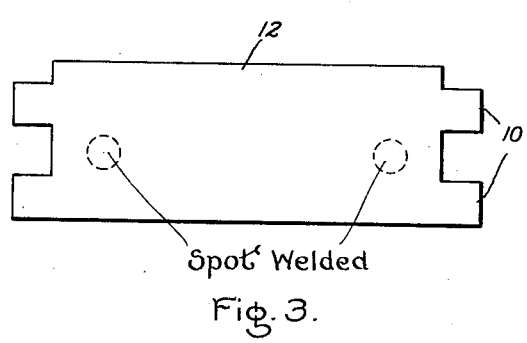
Figure 4:
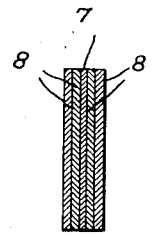

The novel features which I believe to be patentably characteristic of my invention are definitely indicated in the claims appended hereto. The construction and mode of operation of my novel and improved secondary winding will be understood from the following description taken in connection with the accompanying drawings, in which:

Figure 1 is a sectional elevation of an induction motor embodying the novel features of my invention; Fig. 2 is an end view of the secondary member of the motor with a portion of the end ring broken away; and Figs. 3 and 4 are detail views of the composite conductor bar employed in the secondary winding.

The conductor bars of the well known squirrel cage winding are positioned in relatively shallow slots near the surface of the magnetic core of the secondary member of the motor. The starting torque of an induction motor is determined by the losses in the secondary winding, and unless the secondary winding has relatively high impedance at or near standstill the starting torque will be low. To improve the starting torque of an induction motor, it has heretofore been proposed to use relatively deep slots and correspondingly deep conductor bars, which construction gives the conductor bars considerable inductance. The frequency of the secondary current in an induction motor decreases as the speed of the motor increases, and is thus relatively high at or near standstill and decreases as the motor accelerates until at running speeds of the motor the frequency is relatively low. If the conductor bars of the secondary winding have considerable inductance, the effective resistance of the winding will be considerably greater at or near standstill when the frequency of the secondary current is high than at running speeds of the motor when the frequency of the secondary current is low. A secondary winding having relatively deep conductor bars positioned in relatively deep slots in the magnetic core of the secondary member thus has an inductively changing effective resistance, or, in other words, an effective resistance varying with the frequency of the secondary current due to the action of the inductance of the winding. The relatively high effective resistance of the secondary winding at or near standstill increases the secondary losses and gives the motor a better starting torque.

The increased losses in the deep bar secondary winding construction at relatively high frequencies of the secondary current are occasioned principally by eddy currents. The alternating magnetic field to which the conductor bars are subjected sets up eddy currents which flow around the conductor bars in closed paths, indicated generally by the dotted line 15 in Fig. 1 of the drawings. The magniture of the eddy currents depends upon the number of lines of magnetic force surrounding or cutting the conductor bar and upon the frequency of the secondary current. Increasing the depth of the slot and conductor bar increases the number of lines of magnetic force influencing the bar. Diminishing the width of the slot, or more accurately the width of the gap in the magnetic circuit occupied by the conductor bar, reduces the reluctance of the path for the lines of magnetic force, and thus increases the number of such lines. The eddy currents, for any particular frequency of the secondary current, may thus be increased by increasing the slot depth and decreasing the width of the non-magnetic gap occupied by the conductor bar. The flow of eddy currents in the conductor bar causes $I^2R$ losses, and since the magnitude of the eddy currents depends upon the frequency of the secondary current, these losses will be greatest at or near standstill, when the frequency of the secondary current is relatively high, and will diminish as the motor speeds up and the frequency of the secondary current decreases. The increased eddy current losses at or near standstill increases the starting torque of the motor, as is well understood. Since the losses in the secondary winding of the motor are determined by the effective resistance of the secondary winding, it may equally well be said that the effective resistance of a secondary winding of relatively high inductance varies as the frequency of the secondary current, or as commonly expressed, the secondary winding has an inductively changing effective resistance.

The depth of the conductor bars in an ordinary squirrel cage winding for an induction motor of about 15 horsepower is in the neighborhood of $\frac{1}{2}$ of an inch. In speaking of relatively deep slots and correspondingly deep conductor bars, I mean relatively deep with respect to the slots and conductor bars ordinarily employed in a short-circuited secondary winding of an induction motor. As a specific example of the depth of slot which I have found satisfactory in a motor of about 15 horsepower, I mention, merely by way of example, 2 inches, and it will of course be understood that in all cases that slot depth will be selected to secure most satisfactorily the advantages of increased eddy current losses due to deep slot construction.

I have discovered that the increase in the effective resistance due to deep bar construction is very advantageously accentuated when the conductor bar is relatively very thin. This of course particularly applies in the case of small and medium sized motors. For example, it has been found that the conductor bar should be not over $\frac{1}{16}$ of an inch thick in motors up to 15 horsepower, and generally should be much less than $\frac{1}{16}$ of an inch, while in smaller motors the conductor bar should be of considerably less thickness. A slot $\frac{1}{16}$ of an inch wide cannot be practically punched in the laminations of the secondary core member. My present invention, accordingly, contemplates the provision of a composite conductor bar of which the conducting material has such dimensions as to most satisfactorily attain the advantages occasioned by a relatively large eddy current loss.

In the accompanying drawings, I have represented an induction motor having a primary winding 3 carried by a magnetic core 4. The secondary winding of the motor is carried by a magnetic core 5 mounted upon a rotatable shaft 6. The core 5 is provided with slots of considerable depth. These slots are punched in the laminations making up the core with a width considerably greater than the thickness of the secondary conductor bars; for example, the slots may be punched about $\frac{1}{8}$ of an inch in width. Each slot carries a composite conductor bar 12 built up in accordance with my present invention. The composite conductor bar comprises a sheet metal strip 7 of high specific conductivity. This sheet metal strip is of substantially the slot depth but of considerably less thickness than the slot width. Sheet copper is very well adapted as the material from which the strips may be stamped or otherwise formed. Sheet metal strips 8 are positioned on each side of the strip 7, and the strips so assembled are securely bound together by spot welding. The sheet metal strips 8 are of a material of low specific conductivity, and preferably are of magnetic material, such as sheet iron. I have found that the iron which is now commonly employed for transformer cores is admirably suited for the material of the strips 8. In the drawings, I have shown two strips 8 on each side of the strip 7, but it will of course be understood that one strip may be employed or more than two, if necessary. The strip 7 will be positioned approximately in the center of the slot, and one of the functions of the strips 8 is to fill up the slot. The use of magnetic material for the strips 8, furthermore, reduces the reluctance of the magnetic path across the slot, since the only non-magnetic gap in this path is the space occupied by the thin conductor 7. In the particular conductor bar which I have illustrated in the drawings, the thickness of the composite bar is about $\frac{1}{8}$ of an inch, and it will be observed that the strips 7 are considerably less than $\frac{1}{32}$ of an inch in thickness.

The composite conductor bars comprising the thin strip of sheet copper welded in spots between strips of sheet iron are positioned in the slots of the core 5 and secured to end rings 9. The composite conductor bars are provided with tongues 10 adapted to register with slots in the end rings 9. The tongues 10 are secured to the end rings by soldering or in any other suitable manner.

From the foregoing description it will be evident that the composite conductor bars provide parallel paths for the secondary current. The copper strips 7 provide a path of relatively low ohmic resistance between the end rings, while the iron strips 8 provide paths of relatively high ohmic resistance between the end rings.

The very thin conductor bar with adjacent strips of magnetic material reduces the non-magnetic gap in the magnetic circuit of the flux influencing the conductor bar, thereby insuring low reluctance of this magnetic circuit, and therefore increasing the eddy currents, as previously explained. Furthermore, the very thin conductor bar provides a path of relatively high resistance for the flow of the eddy currents, and the eddy current losses are thereby increased. The flow of eddy currents in the conductor bar causes an uneven distribution of the resultant current flowing in the bar, which is evidenced by the crowding of the current toward the top of the bar.

I do not wish to be confined to the details of construction herein shown and described, but aim in the appended claims to cover all modifications within the spirit and scope of my invention.

What I claim as new and desire to secure by Letters Patent of the United States, is,—

1. An induction motor having a secondary member comprising a magnetic core having relatively deep slots therein, a relatively thin conductor of substantially the slot depth but of considerably less thickness than the slot width positioned in each slot, means adjacent each conductor for filling the slot, and end rings connected to said conductors.

2. An induction motor having a secondary member comprising a magnetic core having relatively deep slots therein, a conductor of considerably less thickness than the slot width positioned in each slot, a member of magnetic material on each side of each conductor for filling the slot, and end rings connected to said conductors.

3. An induction motor having a secondary member comprising a magnetic core having relatively deep slots therein, a sheet metal strip of high specific conductivity and of substantially the slot depth but of considerably less thickness than the slot width positioned approximately in the center of each slot, means adjacent both radial faces of each sheet metal strip for filling the slot, and end rings connected to said strips.

4. An induction motor having a secondary member comprising a magnetic core having relatively deep slots therein, a sheet metal strip of high specific conductivity and of substantially the slot depth but of considerably less thickness than the slot width positioned approximately in the center of each slot, strips of magnetic material on each side of each of said sheet metal strips, and end rings connected to said sheet metal strips.

5. An induction motor having a secondary member comprising a magnetic core having relatively deep slots therein, a composite conductor bar in each slot, each composite conductor bar comprising a strip of sheet metal of high specific conductivity and of substantially the slot depth and not over $\frac{1}{16}$ of an inch in thickness secured between strips of low specific conductivity, and end rings connected to said conductor bars.

6. An induction motor having a secondary member comprising a magnetic core having relatively deep slots therein, a composite conductor bar in each slot, each composite conductor bar comprising a sheet copper strip of substantially the slot depth and not over $\frac{1}{16}$ of an inch in thickness welded in spots between strips of sheet iron, and end rings connected to said conductor bars.

7. An induction motor having a secondary member comprising a magnetic core having relatively deep slots therein, a conductor of considerably less thickness than the slot width positioned in each slot, magnetic material coöperating with each conductor to fill the slot so that the non-magnetic gap across the slot is only the space occupied by the conductor, and end rings connected to said conductors.

8. An induction motor having a secondary member comprising a magnetic core having relatively deep slots therein, a relatively thin conductor of less thickness than half the slot width positioned in each slot, magnetic material coöperating with each conductor to fill the slot so that the non-magnetic gap across the slot is only the space occupied by the conductor, and end rings connected to said conductors.

9. An induction motor having a secondary member comprising a magnetic core having relatively deep slots therein, a sheet metal conductor of high specific conductivity and of substantially the slot depth but of less thickness than half the slot width positioned approximately in the center of each slot, a member of magnetic material on each side of each conductor adapted to fill the slot so that the non-magnetic gap across the slot is only the space occupied by the conductor, and end rings connected to said conductors.

In witness whereof, I have hereunto set my hand this 29th day of May, 1915.

SVEN R. BERGMAN.